United States Patent
Cooper et al.

(10) Patent No.: US 9,104,604 B2
(45) Date of Patent: Aug. 11, 2015

(54) PREVENTING UNRECOVERABLE ERRORS DURING A DISK REGENERATION IN A DISK ARRAY

(71) Applicant: International Business Machines Corporation, Armonk, NY (US)

(72) Inventors: Alastair G. Cooper, Winchester (GB); Michael R. Groseclose, Jr., Tucson, AZ (US); David R. Kahler, Tucson, AZ (US); Kurt A. Lovrien, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 13/776,904

(22) Filed: Feb. 26, 2013

(65) Prior Publication Data

US 2014/0245062 A1  Aug. 28, 2014

(51) Int. Cl.
*G06F 11/10* (2006.01)

(52) U.S. Cl.
CPC .... *G06F 11/1092* (2013.01); *G06F 2211/1059* (2013.01); *G06F 2211/1088* (2013.01)

(58) Field of Classification Search
CPC ............ G06F 11/1092; G06F 11/1088; G06F 2211/1088
USPC ............ 714/6.2, 6.32; 707/690, 692; 711/114
See application file for complete search history.

(56) References Cited

U.S. PATENT DOCUMENTS

| | | | |
|---|---|---|---|
| 5,632,012 A | 5/1997 | Belsan et al. | |
| 5,913,927 A * | 6/1999 | Nagaraj et al. | 714/6.13 |
| 6,571,324 B1 * | 5/2003 | Elkington et al. | 711/162 |
| 7,346,804 B2 * | 3/2008 | Forrer et al. | 714/5.1 |
| 7,647,526 B1 * | 1/2010 | Taylor | 714/6.32 |
| 8,407,191 B1 * | 3/2013 | Nanda | 707/692 |
| 2005/0028048 A1 * | 2/2005 | New et al. | 714/54 |
| 2014/0164849 A1 * | 6/2014 | Floeder et al. | 714/47.2 |

* cited by examiner

*Primary Examiner* — Joseph Schell
(74) *Attorney, Agent, or Firm* — Isaac J. Gooshaw

(57) ABSTRACT

Exemplary embodiments of the present invention disclose a method and system for reducing a probability of generating an unrecoverable error on a disk array during a disk rebuild. In a step, an exemplary embodiment identifies a disk to be replaced in the disk array, the disk array including a spare disk. In another step, an exemplary embodiment locates a region in the disk array that incurs a high number of reads and writes during a period prior to replacing the disk in the disk array. In another step, an exemplary embodiment scrubs data in a region in the disk array that has incurred a high number of accesses. In another step, an exemplary embodiment replaces the disk identified to be replaced with the spare disk in the disk array. In another step, an exemplary embodiment rebuilds data on the replaced disk on the spare disk in the disk array.

20 Claims, 4 Drawing Sheets

PREVENTING UNRECOVERABLE ERRORS DURING A DISK REGENERATION IN A DISK ARRAY

FIELD OF THE INVENTION

The present invention relates generally to disk array storage systems, and more specifically to replacing a disk in a disk array.

BACKGROUND OF THE INVENTION

Disk arrays are arrangements of disks that are often configured to enhance reliability and/or performance. Because hard disk operation involves mechanical and electronic components and continuous energy consumption, hard disks have many failure modes, which include mechanical failures, electronic failures, and power failures. To improve a reliability and performance of hard disk storage, arrays of hard disks are formed into systems that may employ disk and data redundancy, data partitioning, disk health monitoring, and parity generation and checking techniques. Data are often stored in patterns on the disks in an array to enhance the speed and reliability with which the data may be accessed.

Redundant Array of Independent Disks (RAID) is a storage technology that combines multiple disk drive components into a logical unit. Data is distributed across the drives in one of several ways called "RAID levels", depending on a desired level of availability and performance. RAID disk array configurations are a set of standard configurations that distribute data across multiple disks, using striping, mirroring and/or parity techniques, to provide various degrees of reliability and/or performance enhancement. Data striping techniques segment logically sequential data, e.g., a file, such that accesses to sequential segments of the data are made to different physical disks. Disk minoring replicates data across multiple physical disks. Various parity techniques enable the detection and often the reconstruction of erroneous or lost data. RAID 5 is a standard RAID configuration that uses striping and parity techniques to enable the data on any one disk in the configuration to be totally reconstructed from error-free data and parity on remaining disks in the array.

SUMMARY

Exemplary embodiments of the present invention disclose a method and system for reducing a probability of generating an unrecoverable error on a disk array during a disk rebuild. In a step, an exemplary embodiment identifies a disk to be replaced in the disk array, the disk array including a spare disk. In another step, an exemplary embodiment locates a region in the disk array that incurs a high number of reads and writes during a period prior to replacing the disk in the disk array. In another step, an exemplary embodiment scrubs data in a region in the disk array that has incurred a high number of accesses. In another step, an exemplary embodiment replaces the disk identified to be replaced with the spare disk in the disk array. In another step, an exemplary embodiment rebuilds data on the replaced disk on the spare disk in the disk array.

DETAILED DESCRIPTION

Figure 1:
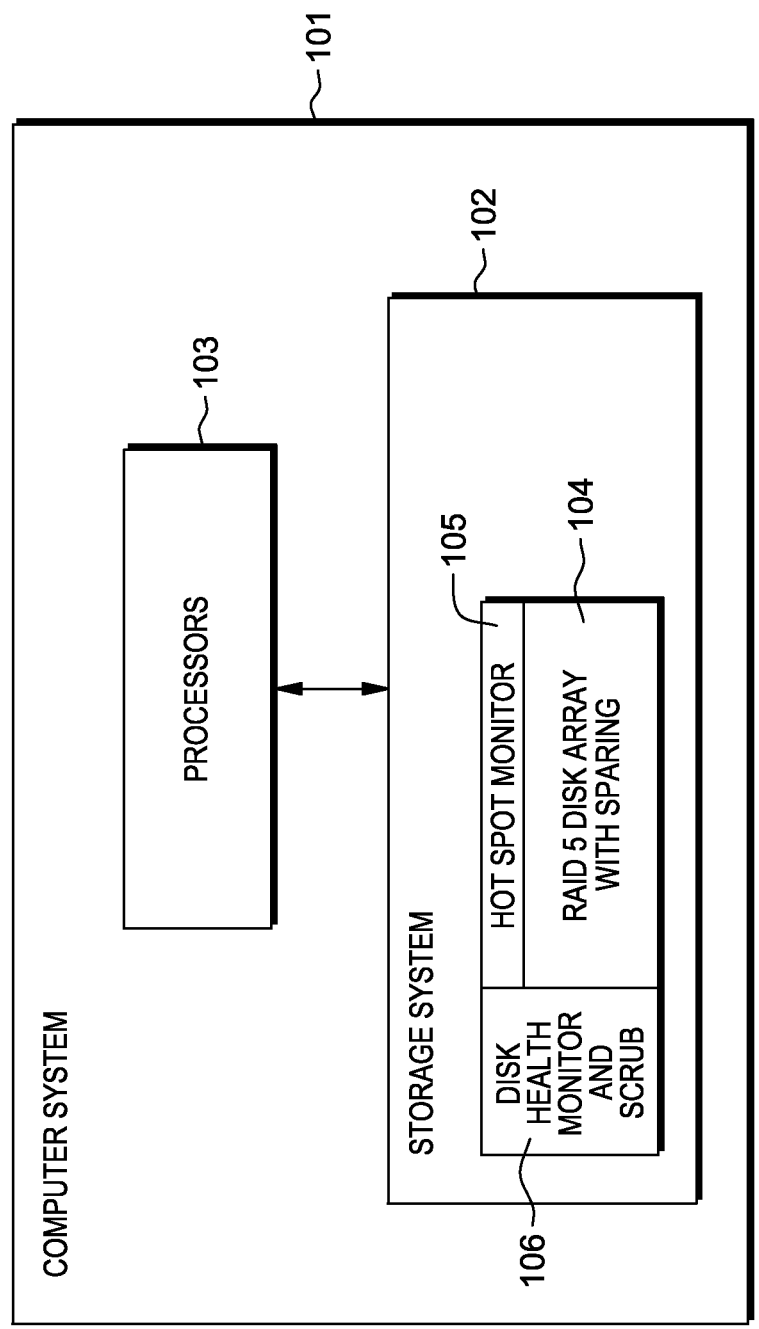
FIG. 1 is a block diagram of a computer system containing processors and a storage system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable medium, as used herein, is not to be construed as being transitory signals per se, such as radio waves or other freely propagating electromagnetic waves, electromagnetic waves propagating through a waveguide or other transmission media (e, g., light pulses passing through a fiber-optic cablw), or electrical signals transmitted through a wire.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Prognostic techniques are often used to anticipate a disk failure before a total failure occurs, enabling a failing disk to be preventively replaced with a spare disk and the data of the failing disk to be reconstructed on the spare disk with minimal impact to overall system operation. Dedicated sparing in a RAID 5 array incorporates a standby spare disk into the array, decreasing down time when a disk in the array is to be replaced by obviating the need for an immediate physical replacement. When data is stored in a RAID 5 array, parity is generated and stored on a disk that is different from the disks on which the data is stored. If a disk fails or is preventively replaced, the parity and data on the remaining disks can regenerate the data that was on the replaced disk and enable the data to be written to a spare disk. This occurs during an array rebuild. A problem occurs if there is a data error on a disk other than a disk that is being replaced. In this case, the parity and data on the remaining disks will regenerate incorrect data during a rebuild, and consequently the data stored on the spare disk will not match the data on the replaced disk, resulting in one or more unrecoverable errors. This problem, which can be caused by a loss of power or a disk failure during a write to a disk, is primarily associated with regenerating a disk in a RAID 5 array and is commonly referred to as the "write hole" problem.

The minimum amount of data that can be written to or erased at once from a hard disk is often a block of data of a constant size that depends on a design of the disk, an operating system in use, and a file system in use. A technique of block-level striping is used in RAID 5 arrays in which data at sequential addresses that is to be written to an array is partitioned into blocks of data and the blocks of data at sequential addresses are written to disks in sequence, e.g., a first block is written to a first disk, a second block is written to a second disk, and so on, wrapping back to the first disk as necessary. While striping provides no data protection, distributing data across disks usually improves performance by enabling disks to access data in a common strip in parallel.

Many systems periodically or opportunistically scrub data in an array to clean parity errors and to refresh a magnetic field (or other physical phenomenon) representing the data. A scrub operation reads data, determines if the data's parity is correct and, if not, rewrites the data with a "write verify" operation. A write verify operation writes data and then immediately reads the data to determine if the data and parity have been correctly written. The data is moved to another region on a disk if the data continues to be incorrectly written. A frequency with which write verifies and data movements are necessary reflect a health of a drive and may lead to a preventive replacement of a disk in an array.

Many systems that store large amounts of data partition data storage media into levels based on access time, with storage in a higher level being logically closer to a processor and having a faster access time than media in a lower level. These storage media are usually smaller in capacity and more costly than media in a lower level. A search for specific data begins at the highest level (nearest to a processor) and, if not found, continues to a next lower level as necessary until the data is found. By moving frequently accessed data up in a storage level hierarchy, an average access time near to that of fast media with a cost near to that of slower media in a lower level can often be approached. Techniques and applications are available that monitor "hot spots" in a storage hierarchy, regions of recent and frequent access, and move the data associated with these regions up in the hierarchy, logically closer to the processors, to enhance performance. Likewise data that has not been recently and frequently accessed may be moved downward to a lower level to free valuable capacity at a higher level. An example application detects and moves hot spots in a hard disk array upward to solid state disk (SSD), in a hierarchy that incorporates both, to enhance performance. SSD mimics an operation of a hard disk with non-volatile semiconductor memory and is significantly faster, more reliable, and more costly than hard disk storage. For example, an IBM Storwize® V7000 storage system includes IBM® System Storage® Easy Tier®, a function that responds to the presence of solid-state drives in a storage system that also contains hard disk drives. The system automatically identifies and moves frequently accessed data from hard disk drives to SSDs, thus placing frequently accessed data in a level of storage that provides a faster access time.

FIG. 1 is a block diagram of a computer system containing processors and a storage system, in accordance with an embodiment of the present invention. FIG. 1 depicts a computer system 101 that includes processors 103, a hard disk mass storage system 102, which stores data in magnetic field patterns on rotating disks coated with ferromagnetic material. RAID 5 disk array 104 is a level 5 RAID array that employs sparing. Sparing is a technique whereby an unused spare disk is physically included in an array, to be immediately available if a disk in the array is replaced with the spare disk and the array is rebuilt. RAID 5 disk array 104 incorporates parity and data distribution techniques to enable one disk in the array to be rebuilt using redundant information stored on the remaining disks in the array. Until a disk rebuild is accomplished, a RAID 5 array can continue to operate with one failed disk, but with reduced performance.

Storage system 102 includes hot spot monitor 105 which monitors data usage on RAID 5 disk array 104. Hot spot monitor 105 identifies and records a hot spot, a location of frequently accessed data during a recent period of time. The record of hot spots direct a scrubbing operation on the hot spots prior to an array rebuild to decrease the probability of a "write hole" error which can lead to permanent data loss.

Storage system 102 includes disk health monitor and scrub system 106 which monitors the frequency with which correctable errors may occur on the disks in RAID 5 disk array 104. A scrubbing function in disk health monitor and scrub system 106 is used to clean correctable errors by rewriting data that incorporates the correctable errors.

Figure 2:
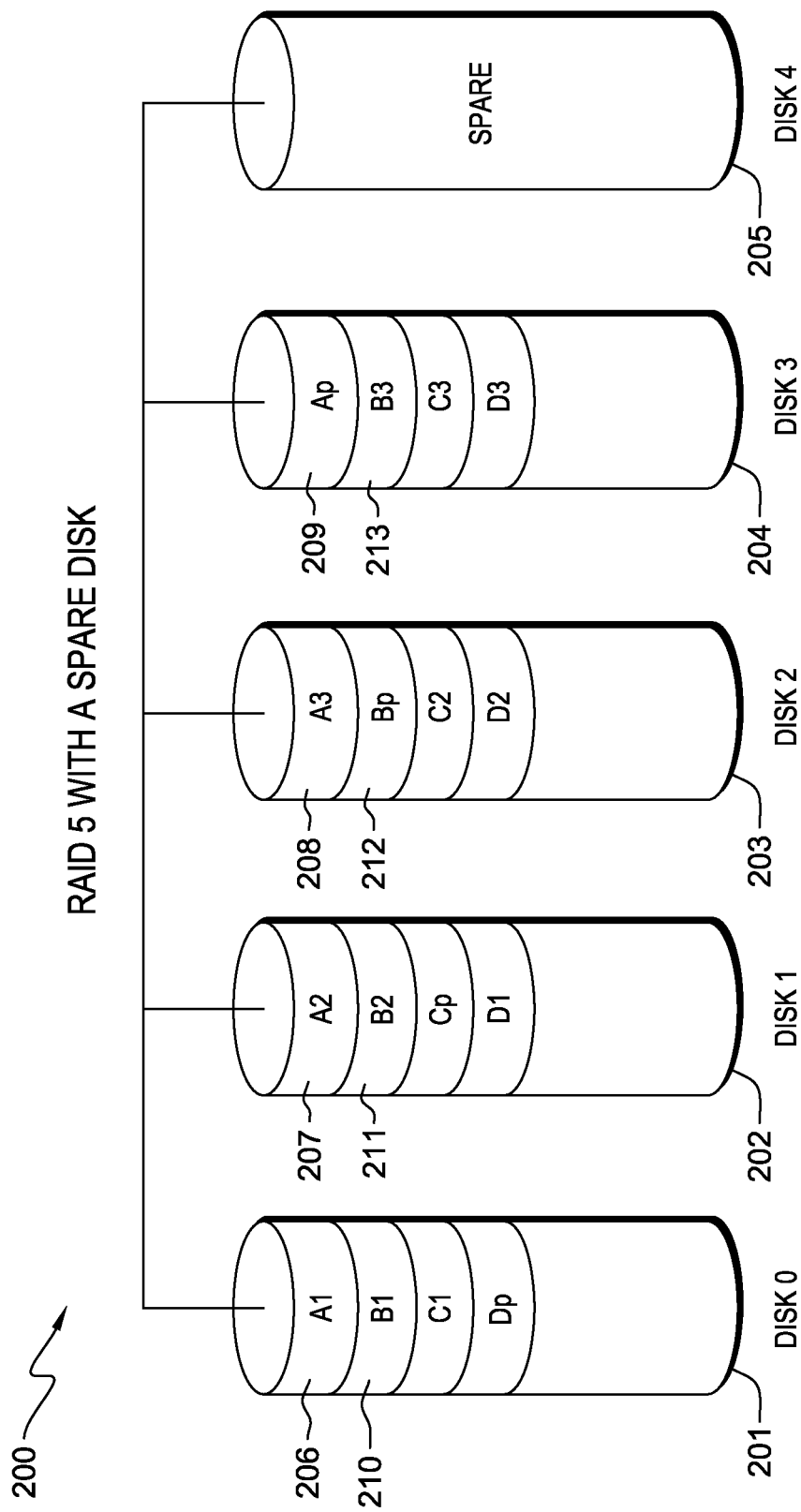
FIG. 2 is a block diagram of a RAID 5 array containing a spare disk, in accordance with an embodiment of the present invention.

RAID 5 disk array 200 in FIG. 2 depicts RAID 5 disk array 104 in more detail. RAID 5 disk array 200 includes five disks, disk 201, disk 202, disk 203, disk 204, and a spare disk 205, in array positions 0, 1, 2, 3, and 4 respectively. RAID 5 disk array 200 employs sparing with spare disk 205 to facilitate a quick array rebuild when necessary and striping to enable data that is in a common strip across multiple disks to be accessed in parallel, enhancing performance.

Data to be stored on RAID 5 disk array 200 is partitioned into a sequence of blocks of data having consecutive addresses and a parity block. Three blocks of data and a parity block form a strip. A strip is stored on RAID 5 disk array 200 such that one of the blocks of the strip is stored on each disk in the array (except that nothing is stored on the unused spare disk). Therefore, a strip in RAID 5 disk array 200 includes one block of data on each of three disks and a parity block, stored on a fourth disk, that is generated from the three blocks of data. In an example, in RAID 5 disk array 200, block 206, block 207, block 208, and parity block 209 form a first strip. A second strip includes blocks 210, 211, 212, and 213. A parity block for the second strip is block 212, stored on disk 203, which is generated from blocks 210, 211, and 213. The position of a disk on which a parity block is stored in each succeeding strip on RAID 5 disk array 200 is shifted to the left by one position. When a position of a parity block in a strip reaches position 0, a next parity block is written to position 3 in the next strip, and continues to rotate through the disk positions in like manner in succeeding strips.

If disk 203, for example, begins to fail by incurring correctable errors, disk health monitor and scrub system 106 detects an occurrence of a frequency of correctable errors on disk 203. If a frequency of errors on disk 203 exceeds a threshold, disk health monitor and scrub system 106 may recommend that disk 203 be replaced with spare disk 205. If a decision is made to replace disk 203 with spare disk 205, any hot spots identified by disk health monitor and scrub system 106 on remaining disks 201, 202 and 204 are scrubbed by disk health monitor and scrub system 106 to decrease a probability of incurring a "write hole" error during an array rebuild.

Figure 3:
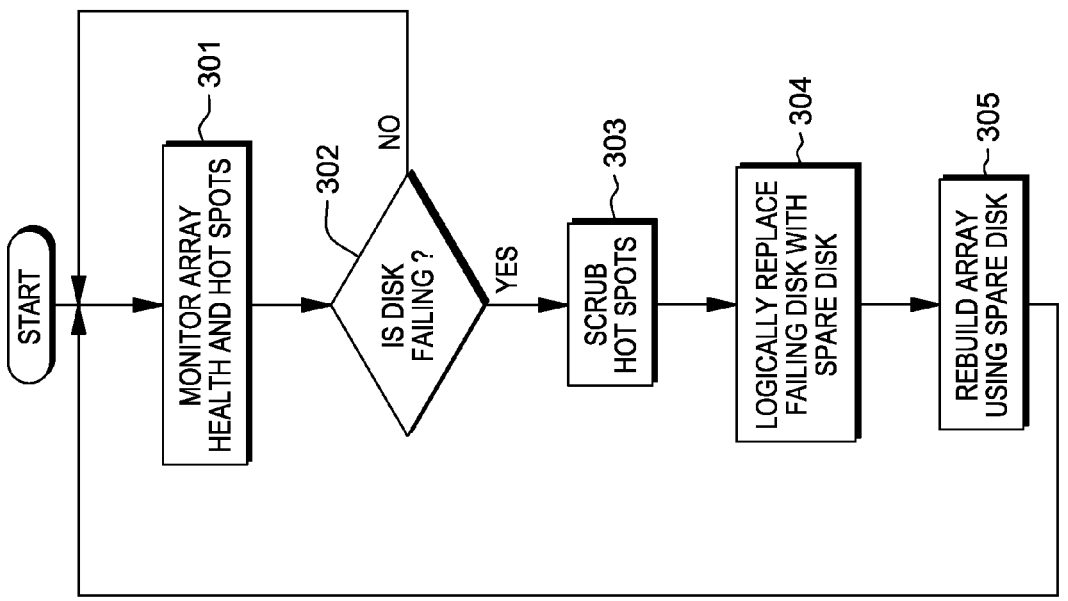
FIG. 3 is a flow diagram that depicts steps taken in preparation for and recovery from a failure in a disk in a RAID 5 array, in accordance with an embodiment of the present invention.

FIG. 3 depicts a sequence of steps by which a probability of an unrecoverable "write hole" error occurring during an array rebuild is decreased. RAID 5 disk array 200 is monitored by disk health monitor and scrub system 106 in step 301 for disk health and disk hot spots. A decision is made by disk health monitor and scrub system 106 in step 302 as to whether a disk in RAID 5 disk array 200 is failing. If a disk in RAID 5 disk array 200 is not failing, monitoring is continued in step 301. If a disk in RAID 5 disk array 200 is failing, disk health monitor and scrub system 106 scrubs hot spots on disks in RAID 5 disk array 200 in step 303 that are not on the failing disk. For example, if disk 203 is found to be failing, hot spots on disks 201, 202, and 204 are scrubbed. In step 304, a spare disk in the array logically replaces a failing disk. In step 305 the spare disk is rebuilt with the data on failing disk 203 by using data on disks 201, 202, and 204. To correctly reconstruct the data on failing disk 203, the data on disks 201, 202, and 204 must be correct, and the probability that the data on disks 201, 202, and 204 is correct is increased by scrubbing hot spots on disks 201, 202, and 204. Each step in a sequence of steps depicted in FIG. 3 may be performed automatically and/or with operator assistance.

Figure 4:
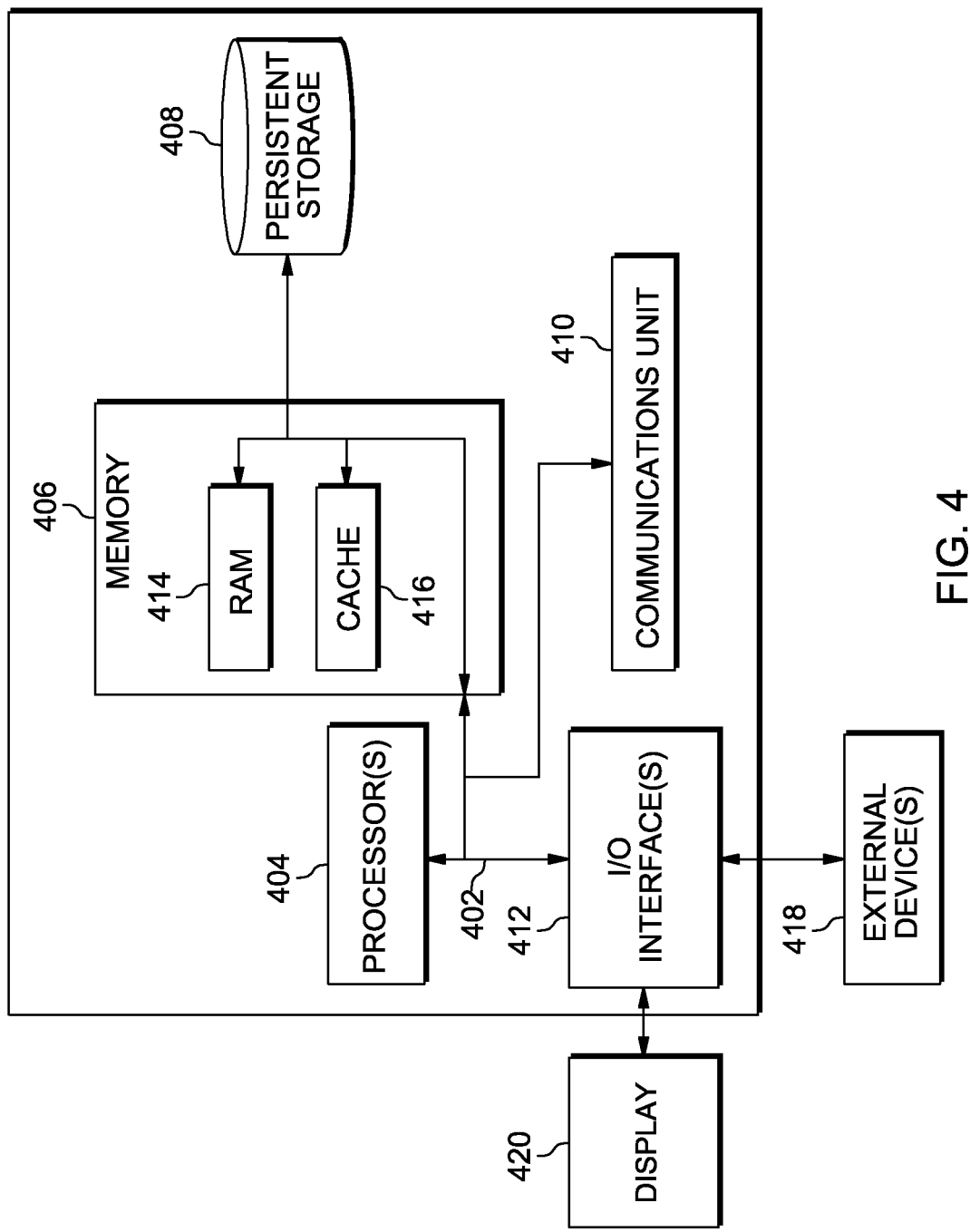
FIG. 4 depicts a block diagram of components of a computing device, in accordance with an embodiment of the present invention.

FIG. 4 depicts a block diagram of components of computer system 101 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 101 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Hot spot monitor 105 and disk health monitor and scrub 106 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computer system 101. In these examples, communications unit 410 includes one or more network interface cards. Communications unit 410 may provide communications through the use of either or both physical and wireless communications links. Hot spot monitor 105 and disk health monitor and scrub system 106 may be downloaded to persistent storage 408 through communications unit 410.

I/O interface(s) 412 allows for input and output of data with other devices that may be connected to computer system 101. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., hot spot monitor 105 and disk health monitor and scrub system 106 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reducing a probability of generating an unrecoverable error on a disk array during a disk rebuild, the method comprising the steps of:
   generating, by one or more processors, a record of reads and writes being made to a plurality of disks included in a disk array, wherein the record indicates a hot spot included in a first disk of the plurality of disks;
   identifying, by one or more processors, a second disk in the disk array that has incurred a threshold number of correctable errors that dictate that the second disk be replaced with a spare disk included in the disk array;
   determining, by one or more processors, whether the hot spot included in the first disk includes data that will be used to rebuild the second disk using the spare disk;
   responsive to an occurrence of both i) an identification of a second disk in the disk array that has met the threshold number of correctable errors that dictate that the second disk be replaced with a spare disk and ii) a determination that the hot spot included in the first disk includes data that will be used to rebuild the second disk using the spare disk, initiating, by one or more processors, scrubbing of data in a region of the first disk that includes the hot spot, wherein scrubbing of data in the region of the first disk reduces a probability of generating an unrecoverable error on the disk array during a rebuild of the second disk using data of the first disk;
   replacing, by one or more processors, the second disk with the spare disk; and
   rebuilding, by one or more processors, data included in the second disk on the spare disk using data included on the first disk that was scrubbed.

2. The method of claim 1, the method further comprising:
   determining, by one or more processors, that the second disk has met the threshold number of correctable errors that dictate that the second disk be replaced with a spare disk based on a frequency of occurrence of correctable errors on the second disk.

3. The method of claim 2, the method further comprising:
   identifying, by one or more processors, one or more disks included in the disk array that include data that can be used to rebuild the second disk when it is determined that the second disk has met the threshold number of correctable errors that dictate that the second disk be replaced with a spare disk.

4. The method of claim 1, wherein the disk array is included as part of a data storage system that actively identifies and moves frequently accessed data from a first level of data storage to a second level of data storage such that an amount of time to access the data is reduced and the probability of generating an unrecoverable error on the disk array during a rebuild of the second disk using data of the first disk is also reduced.

5. The method of claim 4, wherein the disk array is a RAID 5 disk array of a tiered storage system that includes at least one solid-state drive.

6. The method of claim 5, the method further comprising:
   determining, by one or more processors, whether a piece of data has a current frequency of reads and writes that is predicted to result in a generation of a hot spot if the current frequency of reads and writes of that data is not reduced.

7. The method of claim 6, the method further comprising:
   responsive to a determination that the piece of data has a current frequency of reads and writes that is predicted to result in a generation of a hot spot if the current frequency of reads and writes of that data is not reduced, moving, by one or more processors, the first piece of data from a hard disk of the plurality of hard disks to the at least one solid-state drive.

8. A computer program product for reducing a probability of generating an unrecoverable error on a disk array during a disk rebuild, the computer program product comprising:
   one or more computer-readable storage media and program instructions stored on the one or more computer-readable storage media, the program instructions comprising:
      program instructions to generate a record of reads and writes being made to a plurality of disks included in a disk array, wherein the record indicates a hot spot included in a first disk of the plurality of disks;
      program instructions to identify a second disk in the disk array that has met a threshold number of correctable errors that dictate that the second disk be replaced with a spare disk included in the disk array;
      program instructions to determine whether the hot spot included in the first disk includes data that will be used to rebuild the second disk using the spare disk;
      program instructions to respond an occurrence of both i) an identification of a second disk in the disk array that has met the threshold number of correctable errors that dictate that the second disk be replaced with a spare disk and ii) a determination that the hot spot included in the first disk includes data that will be used to rebuild the second disk using the spare disk, by initiating scrubbing of data in a region of the first disk that includes the hot spot, wherein scrubbing of data in the region of the first disk reduces a probability of generating an unrecoverable error on the disk array during a rebuild of the second disk using data of the first disk;

program instructions to replace the second disk with the spare disk; and program instructions to rebuild data included in the second disk on the spare disk using data included on the first disk that was scrubbed.

9. The computer program product of claim 8, further comprising:

program instructions to determine that the second disk has met the threshold number of correctable errors that dictate that the second disk be replaced with a spare disk based on a frequency of occurrence of correctable errors on the second disk.

10. The computer program product of claim 9, further comprising:

program instructions to identify one or more disks included in the disk array that include data that can be used to rebuild the second disk when it is determined that the second disk has met the threshold number of correctable errors that dictate that the second disk be replaced with a spare disk.

11. The computer program product of claim 8, wherein the disk array is included as part of a data storage system that is programmed to actively identify and move frequently accessed data from a first level of data storage to a second level of data storage such that an amount of time to access the data is reduced and the probability of generating an unrecoverable error on the disk array during a rebuild of the second disk using data of the first disk is also reduced.

12. The computer program product of claim 11, wherein the disk array is a RAID 5 disk array of a tiered storage system that includes at least one solid-state drive.

13. The computer program product of claim 12, further comprising:

program instructions to determine whether a piece of data has a current frequency of reads and writes that is predicted to result in a generation of a hot spot if the current frequency of reads and writes of that data is not reduced.

14. The computer program product of claim 13, further comprising:

program instructions to respond to a determination that piece of data has a current frequency of reads and writes that is predicted to result in a generation of a hot spot if the current frequency of reads and writes of that data is not reduced by moving the first piece of data from a hard disk of the plurality of hard disks to the at least one solid-state drive.

15. A computer system for reducing a probability of generating an unrecoverable error on a disk array during a disk rebuild, the computer system comprising:

one or more computer processors;

one or more computer readable storage medium;

program instructions stored on the computer readable storage medium for execution by at least one of the one or more processors, the program instructions comprising:

program instructions to generate a record of reads and writes being made to a plurality of disks included in a disk array, wherein the record indicates a hot spot included in a first disk of the plurality of disks;

program instructions to identify a second disk in the disk array that has met a threshold number of correctable errors that dictate that the second disk be replaced with a spare disk included in the disk array;

program instructions to determine whether the hot spot included in the first disk includes data that will be used to rebuild the second disk using the spare disk;

program instructions to respond an occurrence of both i) an identification of a second disk in the disk array that has met the threshold number of correctable errors that dictate that the second disk be replaced with a spare disk and ii) a determination that the hot spot included in the first disk includes data that will be used to rebuild the second disk using the spare disk, by initiating scrubbing of data in a region of the first disk that includes the hot spot, wherein scrubbing of data in the region of the first disk reduces a probability of generating an unrecoverable error on the disk array during a rebuild of the second disk using data of the first disk;

program instructions to replace the second disk with the spare disk; and program instructions to rebuild data included in the second disk on the spare disk using data included on the first disk that was scrubbed.

16. The computer system of claim 15, further comprising:

program instructions to determine that the second disk has met the threshold number of correctable errors that dictate that the second disk be replaced with a spare disk based on a frequency of occurrence of correctable errors on the second disk.

17. The computer system of claim 16, further comprising:

program instructions to identify one or more disks included in the disk array that include data that can be used to rebuild the second disk when it is determined that the second disk has met the threshold number of correctable errors that dictate that the second disk be replaced with a spare disk.

18. The computer system of claim 15, wherein the disk array is included as part of a data storage system that is programmed to actively identify and move frequently accessed data to from a first level of data storage to a second level of data storage such that an amount of time to access the data is reduced and the probability of generating an unrecoverable error on the disk array during a rebuild of the second disk using data of the first disk is also reduced.

19. The computer system of claim 18, wherein the disk array is a RAID 5 disk array of a tiered storage system that includes at least one solid-state drive.

20. The computer system of claim 19, further comprising:

program instructions to determine whether a piece of data has a current frequency of reads and writes that is predicted to result in a generation of a hot spot if the current frequency of reads and writes of that data is not reduced; and program instructions to respond to a determination that piece of data has a current frequency of reads and writes that is predicted to result in a generation of a hot spot if the current frequency of reads and writes of that data is not reduced by moving the first piece of data from a hard disk of the plurality of hard disks to the at least one solid-state drive.

* * * * *